United States Patent [19]
Flament et al.

[11] Patent Number: 5,850,992
[45] Date of Patent: Dec. 22, 1998

[54] METHOD FOR CONTROLLING THE PITCH ATTITUDE OF A SATELLITE BY MEANS OF SOLAR RADIATION PRESSURE

[75] Inventors: Patrick Flament, Le Cannet; Michel Perdu, Frejus; Jean Portier, Cannes; Pierre Brunet, Siagne, all of France

[73] Assignee: Aerospatiale Societe Nationale Industrielle, France

[21] Appl. No.: 779,509

[22] Filed: Jan. 7, 1997

Related U.S. Application Data

[62] Division of Ser. No. 523,367, Sep. 5, 1995, Pat. No. 5,626,315, which is a continuation of Ser. No. 225,892, Apr. 11, 1994, abandoned, which is a continuation of Ser. No. 916,153, filed as PCT/FR91/00938 Nov. 26, 1991, Pat. No. 5,312,073.

[30] Foreign Application Priority Data

Nov. 30, 1990 [FR] France .................................. 90 15050

[51] Int. Cl.$^6$ ...................................................... B64G 1/24
[52] U.S. Cl. ............................................. 244/168; 701/13
[58] Field of Search .................................. 246/165, 164, 246/168, 173, 169; 701/13

[56] References Cited

U.S. PATENT DOCUMENTS

| | | | |
|---|---|---|---|
| 4,262,867 | 4/1981 | Piening | 244/168 |
| 4,591,116 | 5/1986 | Guenther et al. | 244/168 |
| 4,747,567 | 5/1988 | Johnson et al. | 244/173 |
| 4,759,517 | 7/1988 | Clark | 244/168 |
| 5,310,144 | 5/1994 | Salvatore et al. | 244/168 |

FOREIGN PATENT DOCUMENTS 0297399  11/1989  Japan ..................................... 244/168

*Primary Examiner*—Galen L. Barefoot
*Attorney, Agent, or Firm*—Vanophem Meehan & Vanophem, P. C.

[57] ABSTRACT

A satellite embodying at least one surface intended mainly for exposure to solar radiation and extending away from the satellite in a predetermined direction (Y), an on board computer having connected thereto an attitude sensing system, an orbit control system for imparting thrust to the satellite along predetermined axes, and an attitude control system. The satellite further embodies a device for controlling the tilt of the surface in parallel with a plurality of planes containing the predetermined direction; and, therefore, particularly in parallel with the plane of a solar panel forming the surface. The tilt control device is controlled by the on-board computer. The tilting can generate a moment of pitch or relocate the center of gravity onto the axis of the orbit control system.

3 Claims, 10 Drawing Sheets

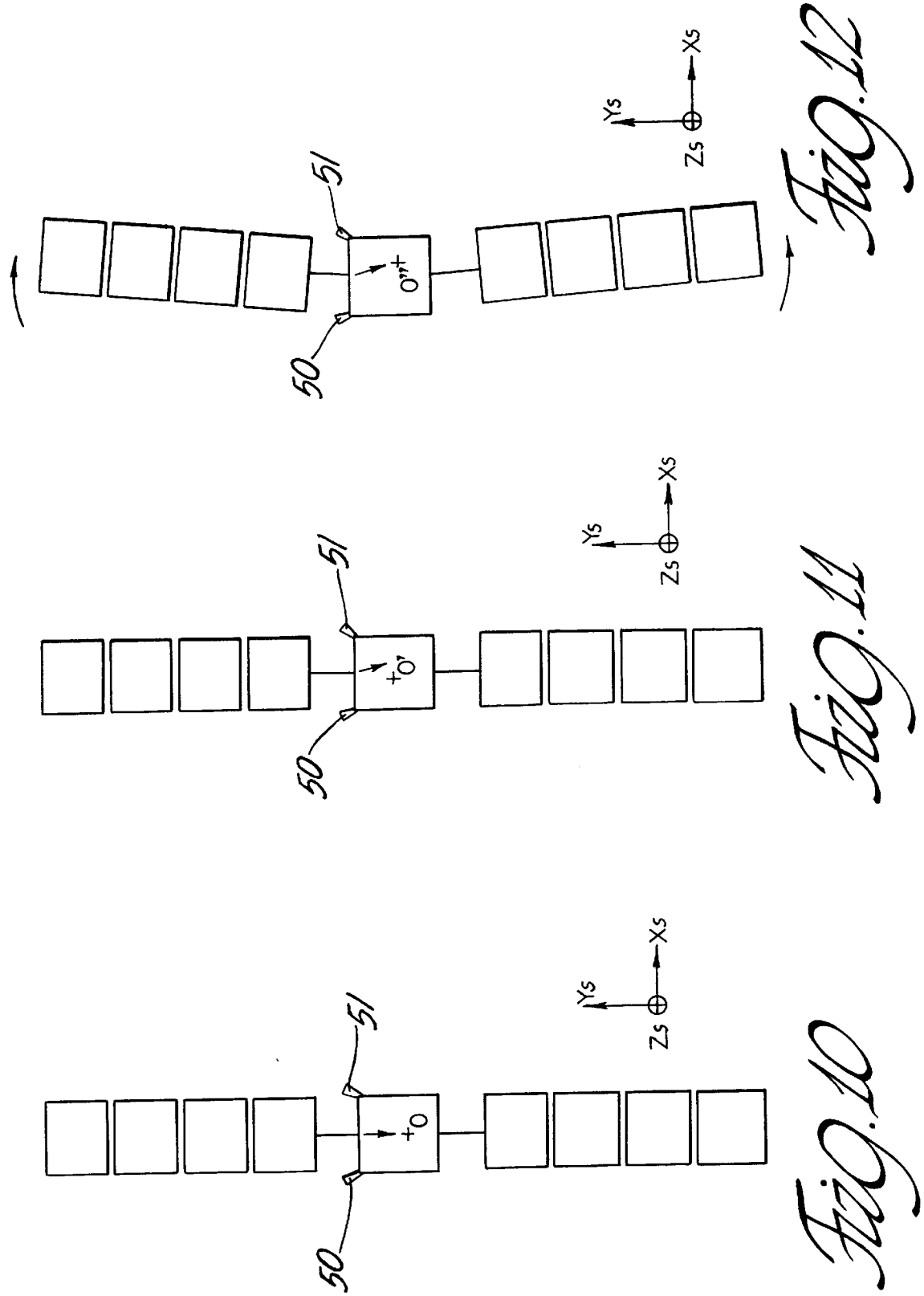

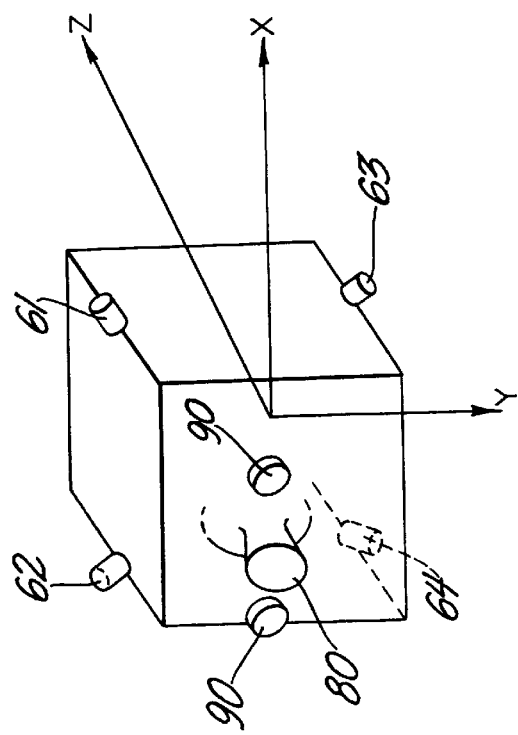
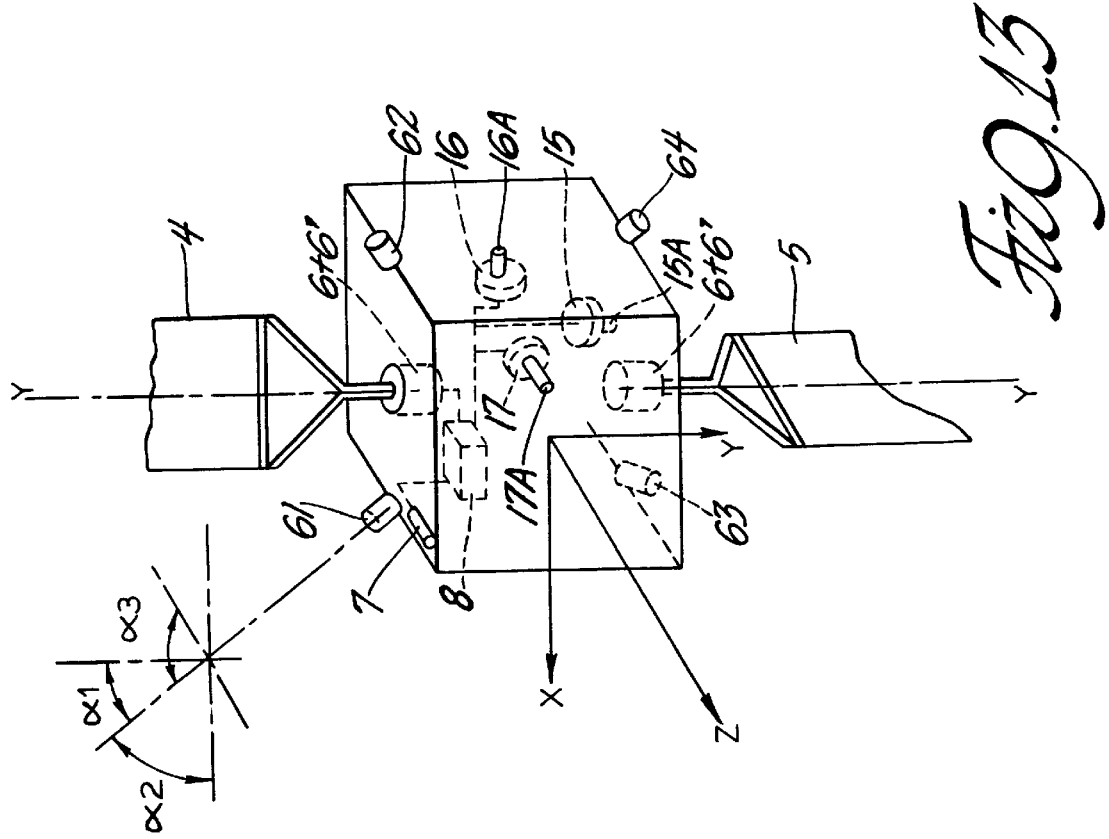

METHOD FOR CONTROLLING THE PITCH ATTITUDE OF A SATELLITE BY MEANS OF SOLAR RADIATION PRESSURE

This is a division of application Ser. No. 08/523,367, filed Sep. 1, 1995, now U.S. Pat. No. 5,626,315 which is a file wrapper continuation application of Ser. No. 08/225,892, filed Apr. 11, 1994, now abandoned which is a continuation application of Ser. No. 07/916,153, filed as PCT/FR91/00938 Nov. 26, 1991 now U.S. Pat. No. 5,312,073.

BACKGROUND OF THE INVENTION

1. Field of the Invention

The invention concerns controlling the attitude of a satellite about its three axes, usually a geostationary satellite stabilized about the three axes, with optional compensation of disturbing torques acting on the satellite about the roll/yaw axes during orbit control maneuvers.

It is also concerned with the general configuration of satellites whose attitude is stabilized about their three geometrical axes in geostationary orbit, whether for civil or military, commercial or scientific purposes, or combinations thereof.

2. Description of the Prior Art

In the present context a satellite is any artificial object in the solar system in orbit around the Earth or any other planet or object of the solar system, or, in solar orbit, possibly a transfer orbit between two planets.

Satellites in orbit are known to be subjected to disturbing torques which make it necessary to control their attitude. The most important causes of disturbing torques are the lack of symmetry about the center of gravity (in space the expression "center of mass" is more appropriate) of the effects of solar radiation pressure (solar pressure for short) due to the angle of incidence (not 90°) of the pitch axis of the satellite to the Sun, different reflectivity characteristics of parts of the satellite and geometrical asymmetries of the satellite; the action of the local (for example terrestrial) magnetic field; the aerodynamic effect of the environment (in low orbits); and the distance from the center of gravity of the satellite to the resultant thrust vector axis of the thrusters used to modify the satellite orbit.

It is possible to distinguish between disturbances related to the environment: solar pressure, interaction of the satellite magnetic dipole with the surrounding magnetic field, gravitational gradient, etc.; these disturbances are weak (order of magnitude=$10^{-5}$N.m) but act on the satellite at all times, and disturbances related to misalignment of the thrust vector of the orbit control chemical thrusters relative to the center of gravity of the satellite; these disturbances are stronger (order of magnitude =10N.m.s per day for a geostationary satellite) but limited in time.

It is essential to provide means for controlling the attitude of a satellite in its orbit. Various active means have already been proposed for this purpose, using a plurality of reaction wheels or thrusters of the mass ejection type, but the principle of ejecting mass requires that the satellite carry a reserve of mass, which increases the weight of the satellite at launch. Further, gas jet thrusters cause intense disturbances which excite the flexible and nutation modes of the satellite, degrading pointing accuracy. Additionally, low-thrust type thrusters such as ion thrusters or electrical arc ionization thrusters consume considerable electrical power and require warm-up phases which generally lead those skilled in the art to avoid using them for attitude control, and reaction wheels are not sufficient in themselves because the wheels must be desaturated to bring their speed to a value near the nominal value from time to time and this requires the application of external torque to the satellite.

To control the attitude of a satellite for an optimal mass budget use is made of disturbing forces due to solar pressure, by appropriately orienting surfaces attached to the satellite, or the local, for example terrestrial, magnetic field, by creating magnetic dipoles on board the satellite by means of pairs of currents.

Various prior art references have already put forward the use of solar radiation pressure for satellite attitude control and orbit control (stationkeeping) using mobile surfaces which can be oriented by means of dedicated actuators or using orientation thrusters already on board.

French Patent 2,513,589 describes a method and a device for aligning with a required direction the roll axis of a satellite which is spin-stabilized and fitted with a plurality of fixed solar panels; mobile surfaces are mounted at the ends of the panels.

French Patent 2,550,757 proposes to control the position of satellites by acting on the solar panels by deforming them to impose a variable backwards curvature on each of them.

French Patent 2,529,166 concerns a satellite stationkeeping method using solar sails and a space vehicle implementing this method. Solar sails disposed to the North and South are mounted on the satellite at the end of pylons parallel to the North-South axis. The pylons can rotate on themselves and the sails can be inclined about axes transverse to the pylons.

German Patent 2,537,577 entitled "Satellite Attitude Control", teaches the provision at the end of the solar panels of surfaces that can be oriented about the axis of the solar panels and transversely thereto.

U.S. Pat. No. 3,304,028 entitled "Attitude Control for Spacecraft", is similar to French Patent 2,513,589, previously mentioned, as is U.S. No. Pat. 3,339,863.

French Patent 2,530,046 entitled "Geosynchronous Satellite Attitude Control Method and Device", teaches the addition of fixed surfaces to the sides of the solar panels.

French Patent 2,531,547 entitled "Geostationary Satellite Attitude Control System", teaches variation of the relative orientations of the solar panels about their axes as does U.S. Pat. 4,325,124 entitled "System for Controlling the Direction of the Momentum Vector of a Geosynchronous Satellite".

European Pat. 0,295,978 proposes a device and a method for pointing a space probe towards a heavenly body. North and South solar sails are added to the satellite which have asymmetrical surface areas, orientations about a North-South axis or inclinations transverse to this axis.

French Patent 2,552,614 proposes a satellite configuration with improved solar means comprising solar panels oriented transversely to the North-South axis and adapted to be oriented about axes transverse to the North-South axis.

Finally, U.S. Pat. No. 4,262,867 provides for solar panels adapted to be partially retracted accordion fashion to each side of which solar sails are hinged about axes transverse to the longitudinal axis of the panels.

These prior art references concern attitude control devices which use solar pressure as their means of actuation. However, all the solutions taught therein have one or other of the following drawbacks. Either they require extra surfaces to be added, with the disadvantages that the additional surfaces increase the mass of the satellite; the addition of mechanisms dedicated to deploying the surfaces in orbit increases the mass and the risk of failure; and the additional overall dimensions due to the surfaces represent a satellite volume penalty at launch; or they provide satellite attitude control about one or two axes only, requiring further means for control about the third axis.

Various documents have proposed displacing the center of gravity of the satellite to reduce the disturbing torques related to misalignment between the center of gravity and the thruster (or solar pressure) thrust vector. They include U.S. Pat. No. 4,684,084 entitled "Spacecraft Structure with Symmetrical Mass Center and Asymmetrical Deployable Appendages"; U.S. Pat. No. 4,345,728 entitled "Method for Controlling the Attitude of a Spinning Spacecraft in the Presence of Solar Pressure"; and U.S. Pat. No. 3,516,623 entitled "Stationkeeping System".

U.S. Pat. Nos. 3,516,623 and 4,345,728 propose reducing the disturbing torques acting on a spin-stabilized satellite related to misalignment of the center of gravity and the thrust by moving the center of gravity using mobile weights, these weights and their actuators having no other function.

U.S. Pat. No. 4,684,084 describes a satellite configuration in which the disturbing torques due to misalignment between the center of gravity and the thrust vector of the orbit control thrusters are reduced. The center of gravity is moved towards the thrust axis by appropriate positioning of the solar generator panels after they are deployed. This positioning is fixed and not variable in flight. This configuration is such that the center of gravity is substantially fixed despite the deployment of highly asymmetric appendages, but there is no possibility of modifying the position of the solar generator panels in flight. This has the drawback of increasing the disturbing torques due to solar radiation and of providing nothing to compensate this.

As for the propulsion employed during the operational phase of current three-axis stabilized satellites, in particular in the United States, Japan and Europe, this is purely chemical (using hydrazine or a mixture of propellants, for example) or chemical with electrical assistance (example: power augmented catalytic thruster (PACT) heated or electrical arc (Arcjet) hydrazine or ion or plasma thrusters for orbit correction.

However, in the final analysis attitude control is achieved by chemical propulsion with intermediate storage of angular momentum in one or more inertia wheels about two or three axes.

Relevant publications include: "The Attitude Determination and Control Subsystem of the Intelsat V Spacecraft"—Proceedings of the AOCS Conference, Noordwijk, October 1977; "Precision Attitude Control with a Single Body-Fixed Momentum Wheel"—AIAA Mechanics and Control Flight Conference—Anaheim, Calif., August 1974; U.S. Pat. 4,949,922 entitled "Satellite Control System"; and "Satellite Attitude and Orbit Control System: Developments to the 80–90's"—L'Aé ronautique et l'Astronautique—no. 69, 1878-2 p 33–56.

Similarly, the use of electrical propulsion for orbit control and even attitude control is under widespread consideration at the present time, as indicated by the following publications, in particular, "Electric Propulsion Projects and Researches in Japan", AIAA 20th International Electric Propulsion Conference, Garmisch, Partenkirchen (Germany), October 1988; "Design and Integration of an Electric Propulsion System on the Eurostar Spacecraft", same conference as above; "Readiness Appraisal: Ion Propulsion for Communication Satellites", AIAA 12th International Communication Satellite Systems Conference, Crystal City, March 1988; and "Chemical and Electric Propulsion Tradeoffs for Communication Satellites", Comsat Technical Review Volume 2 Number 1, Spring 1972, pp 123–145.

With reference to ion thruster propulsion as such, reference may be made to French Patent 2,510,304 entitled "Field Emission Ion Source Suitable for Electric Propulsion of Space Craft"; U.S. Pat. No. 3,279,176 entitled "Ion Rocket Engine"; and U.S. Pat. No. 4,829,784 entitled "Method and System for Storing Inert Gas for Electrical Impulse Space Drives".

SUMMARY OF THE INVENTION

An object of the invention is to exploit the solar radiation pressure acting on pre-existing surfaces provided primarily to be exposed to solar radiation (solar generator panels and/or solar sails) to control the attitude of a satellite in pitch reliably and simply, with the least possible additional mass, in a manner that is decoupled and compatible with any known type of roll/yaw control, also based on solar radiation pressure, for example.

Another object of the invention is to reduce the power requirement for attitude control, to minimize the attitude disturbance during orbit control maneuvers with no significant mass or reliability penalty.

Another object of the invention is to enable redundancy to be incorporated into the solar generator panel drive motors which at present constitute a single point failure hazard.

Another object of the invention is to obtain maximum benefit for attitude control (about the three axes) and orbit control from electrical propulsion (the great advantage of which is a much better specific impulse than chemical propulsion), of a kinetic energy storage system advantageously with no gyroscopic stiffness based on reaction wheels (lighter in weight than inertia wheels which have a non-null angular momentum at all times) and disturbing forces generated by the solar radiation pressure, in order to be able to dispense with any chemical propulsion in the operational phase and to minimize the overall mass of the components of the satellite dedicated to attitude control (about three axes) and orbit control, at moderate cost (manufacture and launch) and with improved overall reliability (because of the eliminated risk of leakage associated with the use of chemical propulsion).

To this end the invention proposes a satellite having at least one surface intended principally to be exposed to solar radiation and extending from the satellite in a given direction, an onboard computer and connected to the latter an attitude sensor system, orbit control means adapted to apply to the satellite thrusts along given axes and attitude control means, characterized in that it further has means for tilting the surface parallel to a plurality of planes containing the given direction, the tilt means being controlled by the onboard computer with or without action from the ground.

According to preferred features of the invention the surface intended principally to be exposed to solar radiation is a plane solar generator panel extending along the given direction and connected to the satellite by a drive motor adapted to rotate the panel about the given direction.

The tilt means include the drive motor and a second motor disposed between the drive motor and the solar generator panel. The second motor is a rotary motor having an axis inclined at a non-null angle a relative to the given direction and the non-null angle is between 2° and 15°. The tilt means include a pivot motor whose axis is transverse to the given direction, which motor provides a range of movement of at most 15° relative to the given direction.

The tilt means include a second pivot motor whose axis is transverse to the given direction and has a non-null inclination to the axis of the first pivot motor.

The tilt means include a linear motor extending in a direction inclined to the given direction and mounted on one side of a deformable articulated triangle coupling the surface of the satellite.

The orbit control means may be electric thrusters, or electric arc ionization thrusters.

The attitude control means during orbit control maneuvers are the surface and the tilt means or the attitude control means during orbit control maneuvers is an orientable angular momentum system.

The invention also proposes a satellite adapted to be stabilized in attitude about roll, yaw and pitch axes in an at least approximately circular terrestrial orbit around the terrestrial North-South axis and includes a body having North and South sides, an attitude sensor system, an onboard computer connected to the attitude sensor system, at least one solar generator panel extending substantially parallel to the pitch axis and coupled to the body by a device for rotating it about the pitch axis under the control of the onboard computer so that the panel remains at all times at least approximately perpendicular to the solar radiation, a kinetic energy storage system for at least three axes controlled by the onboard computer and an attitude control and orbit correction propulsion system controlled by the onboard computer.

The attitude control and orbit correction propulsion system is exclusively electrical and has at least a first pair of two electric thrusters disposed substantially symmetrically relative to the plane of the pitch and yaw axes with non-null inclinations relative to the plane of the roll and yaw axes and to the plane of the pitch and yaw axes and inclinations of not more than approximately 20° to the plane of the roll and pitch axes.

The satellite further includes between the body and the solar generator panel a device for tilting the panel parallel to a plurality of planes containing the pitch axis, the tilt device being controlled by the onboard computer.

According to optionally combinable preferred features of the invention the electric thrusters of the first pair are disposed near one of the North and South sides, near edges bordering the side parallel to the yaw axis, or are disposed substantially at the middle of the edges.

The propulsion system includes a second pair of electric thrusters disposed substantially symmetrical to the plane of the pitch and yaw axes with non-null inclinations to the plane of the roll and yaw axes but in the opposite direction to the thrusters of the first pair, non-null inclinations to the plane of the yaw and pitch axes and inclinations of not more than approximately 20° to the plane of the roll and pitch axes.

The first and second pairs of electric thrusters are substantially symmetrical to the plane of the roll and yaw axes.

The propulsion system has four electric thrusters only, and each electric thruster is inclined to the roll axis at an angle between 40° and 75° in absolute value and to the pitch axis at an angle between 15° and 65° in absolute value.

A second solar generator panel extends substantially parallel to the pitch axis on the opposite side to the first panel and is coupled to the body by a second device for rotating it about the pitch axis under the control of the onboard computer so that the second panel is at all times at least approximately perpendicular to the solar radiation and by a second device for tilting the second panel parallel to a plurality of planes containing the pitch axis, the panel tilt devices being controlled conjointly by the onboard computer.

The kinetic energy storage system has no permanent gyroscopic stiffness, and is constituted by at least three reaction wheels whose angular momentum can be reduced to zero.

This aspect of the invention is, therefore, not concerned either with the use of electrical propulsion as such to carry out orbit correction maneuvers or with an attitude control system having no nominal gyroscopic stiffness as such, but a specific combination of the two, with the capability of displacing transversely to the pitch axis the center of thrust of the solar radiation pressure on the sails, so that:

1—it is never necessary to use chemical propulsion during the operational phase (in practice the geostationary phase), 2—it is possible to provide only four electric thrusters (two may even suffice if they are sufficiently reliable) to carry out orbital corrections in the North-South direction (approximately 50 m/s per year) and in the East-West direction (almost 5 m/s per year), even if one thruster fails, and 3—there is no requirement for a "gimbal" system for repainting the electric thrusters.

With regard to the first point, the use of chemical propulsion during the geostationary phase is essential in all existing or currently planned satellites for direct control of one to three axes of the satellite using an attitude detector-processor-chemical actuator feedback loop;

to desaturate the reaction or inertia wheels which have stored angular momentum about one to three axes of the satellite (the overall feedback loop is then: attitude detector-processor-angular momentum storage-speed detector-chemical actuator); or to meet the requirements of any axis by axis combination of the two facilities (direct control or intermediate storage).

A satellite in accordance with this aspect of the invention uses electric propulsion to desaturate (reduce towards zero) the stored angular momentum about the yaw axis. Desaturation about the other axes (roll and pitch) is provided by conventional non-chemical means such as solar sails or magnetic loops. Desaturation of the stored angular momentum about the yaw axis is rendered possible by the necessity to carry out at least one orbit correction maneuver each day. It is sufficient to carry out this maneuver in such a way that one of the electrical thrusters operates for longer than the other.

Electrical propulsion with a thrust of 10 to 40 mN (millinewtons) per thruster requires daily maneuvers of almost one hour's duration, compared with twice-weekly maneuvers of one hundred seconds' duration, typically for thrusts in the order of 10 Newtons, with chemical propulsion.

For equal lever arms, the disturbing moments accumulated during a typical North-South maneuver are therefore around one tenth for electrical propulsion as compared with chemical propulsion and can be accumulated in reaction wheels, for example, without requiring larger inertia type wheels. On the other hand, in the case of chemical propulsion the disturbing torques induced by orbit correction maneuvers are so high that kinetic or reaction wheels are unable to compensate for them.

Only electric propulsion allows the use of small reaction wheels for absorbing disturbing moments and, therefore, preserving the attitude of the satellite. By definition, small reaction wheels do not impart any nominal gyroscopic stiffness to the satellite. The mean value over the life of the satellite of the accumulated angular momentum, axis by axis, is zero or very near zero, with a wide range of variation either side of zero.

With regard to the second point above, the use of only four thrusters to provide for inclination corrections (North-South) and drift corrections (East-West), even with one thruster failed, is also based on the judicious use of electrical propulsion because its specific impulse is very much higher than that of chemical propulsion (1,500 to 3,000 s against typically 300 s), the propellant budget for drift correction becomes negligible (typically 40 to 50 kg against 500 for chemical propulsion) and it is possible to use a single thruster instead of two. If the thrusters are appropriately oriented, the resulting disturbing torques can be sorted temporarily in small reaction wheels which are desaturated later using low external torques (solar sails, magnetic coils).

The possibility of tilting the panels relative to the pitch axis has the following advantages.

Failure of any one of the four thrusters will not endanger the mission. On current chemical systems the loss of any one of at least twelve thrusters means that one entire branch of the system (six thrusters) must be shut down and only the other, redundant branch used. A second failure terminates the mission if chemical propulsion is used but merely reduces its duration if electrical propulsion is used.

With reference to the third point above, recently developed concepts of using electrical propulsion on board geostationary satellites (the ESA ARTEMIS satellite, for example) require mounting the electrical thrusters on gimbals so that they can be oriented optimally to reduce the disturbing torques during maneuvers.

These satellites use chemical propulsion to eliminate the accumulated angular momentum. As the thrust developed by chemical thrusters is relatively high, the pulses must be very short to avoid disturbing the attitude of the satellite. This reduces the overall efficiency of the operation because the specific impulse of the chemical thrusters used with very short pulses (in the order of ten milliseconds) is very low. To avoid the need for prohibitive quantities of propellants, an attempt is made to eliminate the primary cause, in other words the lever arms of the disturbing torques, by reorienting the electrical thrusters in flight.

Our concept of a satellite with no nominal gyroscopic stiffness, totally unsuited to chemical propulsion during orbit control maneuvers, is suited to the slow accumulation of angular momentum during maneuvers and to a slow return towards a virtually null global angular momentum by the action of low external torques (solar sails, magnetic torques).

According to other optionally combinable preferred features of the invention;

at least some of the electric thrusters are ion thrusters;

at least some of the electric thrusters are plasma thrusters;

a system for attitude control during the phase of injection into the operational orbit is connected to the same single-propellant storage tank as the electric thrusters;

the satellite constitutes a dual propulsion and attitude control propellant system for the operational orbit injection phase;

the rotation device and the tilt device of each panel are controlled by the onboard computer to generate attitude correction about the three axes using the solar radiation pressure on each panel; and the onboard computer is adapted to control yaw attitude correction by the electric thrusters.

The invention also proposes a method of controlling the attitude of a satellite having a surface intended principally to be exposed to solar radiation and extending from the satellite in a given direction, an attitude measuring device and a computer adapted to determine the value of an attitude correction torque to be applied in pitch, characterized in that the surface is tilted transversely to the solar radiation so as to generate a pitch torque substantially equal to the required attitude correction torque.

According to other preferred features of the invention, prior to applying an orbit control thrust in a given direction the amplitude and the direction of the offset of the satellite center of gravity from this given thrust direction resulting from attitude disturbances during a previous orbit maneuver are estimated and the surface is tilted at least in part parallel to a plane containing the given direction in which the surface extends and the direction of the difference so as to move the center of gravity towards the given thrust direction. During each orbit control maneuver the attitude of the satellite is stabilized by action of an orientable angular momentum system after which, before the next orbit control maneuver, the surface is tilted parallel to the solar radiation to stabilize the satellite in pitch and to move the orientable angular momentum into a given orientation relative to the satellite.

Thus, in a method in accordance with the invention, the position of the center of the solar panel surface is moved laterally, by movement in translation transversely to the pitch axis. As a result, the solar pressure generates a torque in pitch which enables attitude control, wheel speed desaturation and/or pitch disturbing torque compensation.

The solar generator may be displaced by any appropriate known actuators which are not in themselves part of the present invention.

The benefit of the invention lies in the following advantages.

The pitch control obtained does not modify, or modifies only minimally, the roll/yaw behavior of the satellite, so that it can be combined with any known type of roll/yaw control.

The lateral displacement of the solar panels displaces the center of gravity of the satellite enabling it to be aligned with the thrust of the North, South, East and West orbit control thrusters; this reduces very considerably roll/yaw disturbance during North-South orbit control maneuvers and pitch disturbance during East-West maneuvers.

The additional mass of the actuators is compensated by the saving in propellant achieved by dispensing with ejection of material for attitude control (at least in pitch) and by minimizing roll/yaw disturbance during orbit control maneuvers.

The additional actuators can be used to back-up the conventional drive motors for rotating the solar generator panels if the configuration adopted is one in which a motor with a slightly inclined axis is stacked on the drive motor; this redundancy is a substantial benefit over conventional solutions in which the drive motors constitute a single point failure hazard.

The use of this concept makes it possible to design a satellite in which the use of gas jet thrusters would be abandoned during orbit, for example in favor of electrical thrusters (ion, electric arc ionization or plasma type) dedicated to orbit control only. A concept of this kind is advantageous because of the pointing accuracy permitted by the absence of disturbances due to the thruster gas jets, and because of the saving in propellant mass made possible by the better specific impulse of electrical thrusters as compared with gas jet thrusters.

Objects, features and advantages of the invention will emerge from the following description given by way of non-limiting example with reference to the appended drawings.

BRIEF DESCRIPTION OF THE DRAWINGS

FIG. 10 is a diagrammatic view of the ideal configuration of an ideal satellite during an orbit control maneuver;

FIG. 11 shows a real configuration of a real satellite;

FIG. 12 shows a real configuration of the real satellite improved in accordance with the invention;

FIG. 13 is a perspective view to a larger scale of the body of the satellite from FIGS. 1 and 3;

FIG. 14 is a perspective view of the satellite body as seen in FIG. 13 rotated 180°;

DETAILED DESCRIPTION OF THE PREFERRED EMBODIMENT

Figure 1:
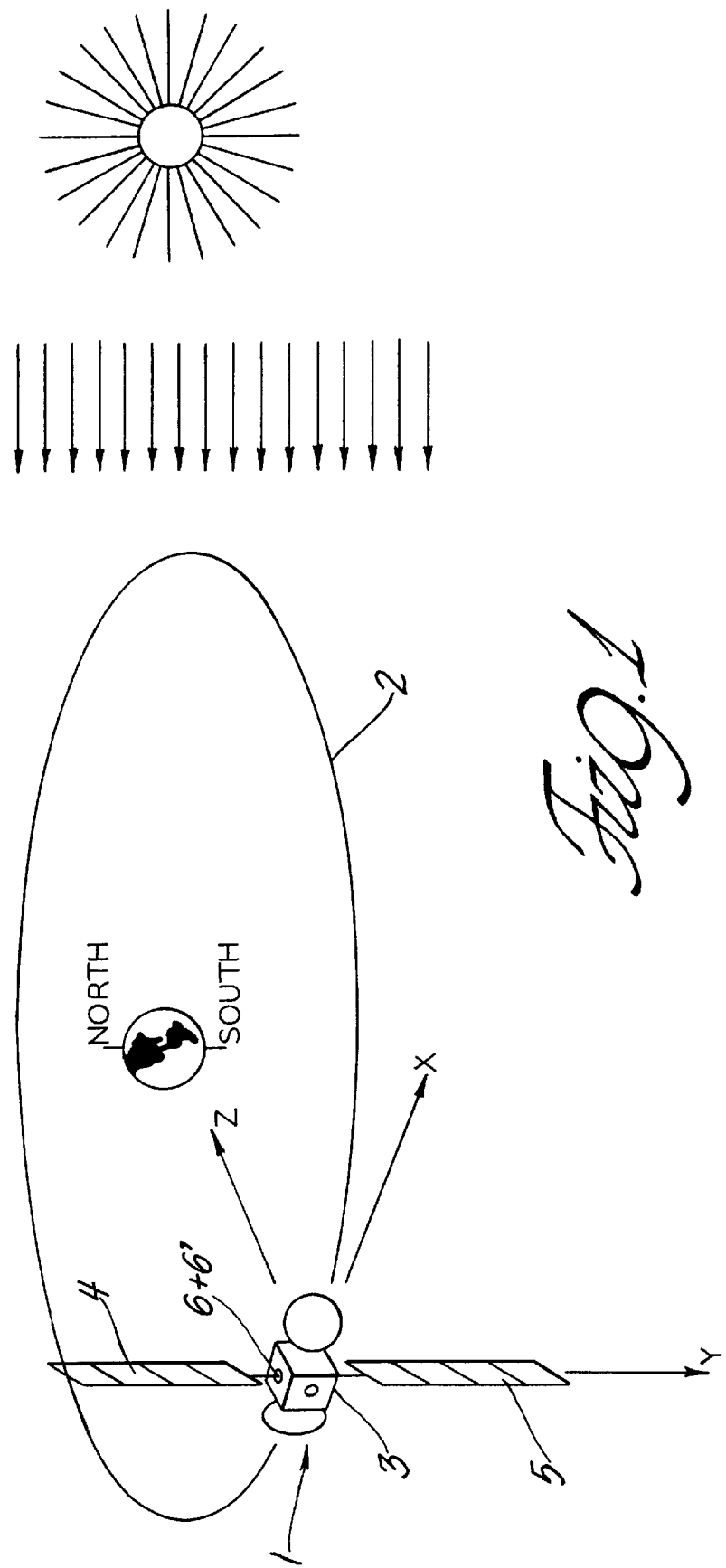
FIG. 1 is a diagrammatic view of a spacecraft stabilized about its three axes in orbit about the Earth.

FIG. 1 shows a satellite 1 in a circular Earth orbit 2, for example a geostationary orbit inclined at not more than 5°, for example at 0.5°.

The satellite has a central body 3 with which are associated three axes defining a satellite-related direct frame of reference. An axis X tangential to the orbit 2 and in the same direction as the orbital speed, conventionally called the roll axis; an axis Y perpendicular to the plane of the orbit 2 and oriented in the Earth's North-South direction, conventionally called the pitch axis; and an axis Z perpendicular to the X and Y axes and directed towards the Earth, conventionally called the yaw axis.

On some satellites this frame of reference may be oriented differently to the orbit and/or the Earth depending on mission-related imperatives.

The satellite has an attitude control device, as will be explained below, by which it is stabilized about its three axes.

The satellite includes an attitude measuring device (conventional in itself) connected to a processor (also conventional) which calculates the corrections to be applied by the attitude control device. The device conventionally includes (see FIG. 3) an Earth sensor 7, for example of the infrared type, usually adapted to measure the attitude in roll and in pitch. However, it may instead include Sun sensors or star sensors (not shown) to measure the attitude, in particular the attitude in yaw, if required. The processor is in practice part of an onboard computer 8 shown in dashed line in FIG. 3.

Also conventionally, the satellite includes a solar generator with two panels 4 and 5 extending, respectively, towards the North and towards the South along longitudinal axes coincident with the Y axis. The panels can be oriented relative to the central body 3 about rotation axes which are at least approximately coincident with the Y axis by two separately controlled drive motors of any appropriate known type and one of which, mounted on the North side of the satellite, is denoted by the reference number 6 in the combination 6+6' of FIG. 3; these motors are normally intended to hold the panels substantially facing the Sun, perpendicularly to its rays.

On some satellites the solar generator has only a single panel carried on the North and South side. In this case the satellite may also carry a solar sail on the opposite side (either orientable or symmetrical about an axis parallel to Y) the function of which is to rebalance the satellite as a whole with respect to the position of the center of gravity and the position of the mean thrust due to solar pressure. This type of configuration does not rule out the use of the present invention. There can even be more than two panels or sails parallel to the pitch axis.

Herein the term "solar generator" refers to the combination of one or two (or even more) panels and the term "solar generator panel" denotes assemblies which can be oriented by drive motors, in other words assemblies constituting the solar generator itself, that is to say the set of cells converting the light energy into electrical energy by the photovoltaic effect, for example; the structure supporting these components; the mechanisms coupled to the structure to enable it to be stowed before the satellite reaches its orbital position, to deploy it and to hold it in the deployed position; and all the additional components which, in the orbital configuration, are fixed to the structure and which have various functions, for example thermal protection flaps which limit heat losses from the satellite during phases in which the solar generator is not deployed or surfaces for increasing the light impinging on the photovoltaic devices (shadow uniformization screens, for example).

In some cases deployable heatsinks fitted to the satellite can be used as surfaces exposed to the solar pressure.

In practice the satellite also includes various appendages (antennas, etc.) which are fixed or virtually fixed and whose exposure to the solar pressure causes disturbing torques which are combined with those resulting from any asymmetry of the solar generator. Telecommunication satellites, for example, usually include one or more transmission antennas and the radiation pressure of the transmission beam generates a disturbing torque about the Y axis which is added to those previously mentioned.

In a manner that is also conventional, the satellite has orbit control thrusters 9 of the chemical type, for example, the function of which is to return the satellite to its nominal position in space at regular intervals. Orbit control thrusters are needed because of the tendency of any orbiting object to be moved out of its initial orbit by various disturbing forces. For example, in geostationary satellites the attraction of the Moon and Sun causes unwanted inclination of the orbit and the anisotropic shape of the Earth causes a drift towards the East or the West of the apparent position of the satellite relative to the Earth. In all cases this system has become necessary to modify the orbit of the satellite when this is a requirement of the mission, even if only at the end of its useful life, or injection into a cemetary orbit.

According to another aspect of the invention to be explained with reference to FIGS. 13 and 14 the system utilizes only electric thrusters; this will be explained later.

The satellite 1 is provided with a pitch attitude control system compatible with any other known means of satellite control in roll and in yaw, in particular solar control, for example of the type described in one of the following references, namely, French Patents 2,655,167, 2,656,586, 2,531,547, or French Patent 2,530,046, or U.S. Pat. No. 4,325,124. As explained below, this pitch control is decoupled from roll/yaw attitude control.

Also, the present invention is compatible with the philosophy underlying the teachings of the references mentioned above, hereby incorporated by way of reference, which is to add only minimum items to the satellite, or even none at all.

Coupled to a device of the same kind as those mentioned above, the invention makes it possible to use solar radiation pressure to control the attitude of the satellite about its three axes.

Figure 3:
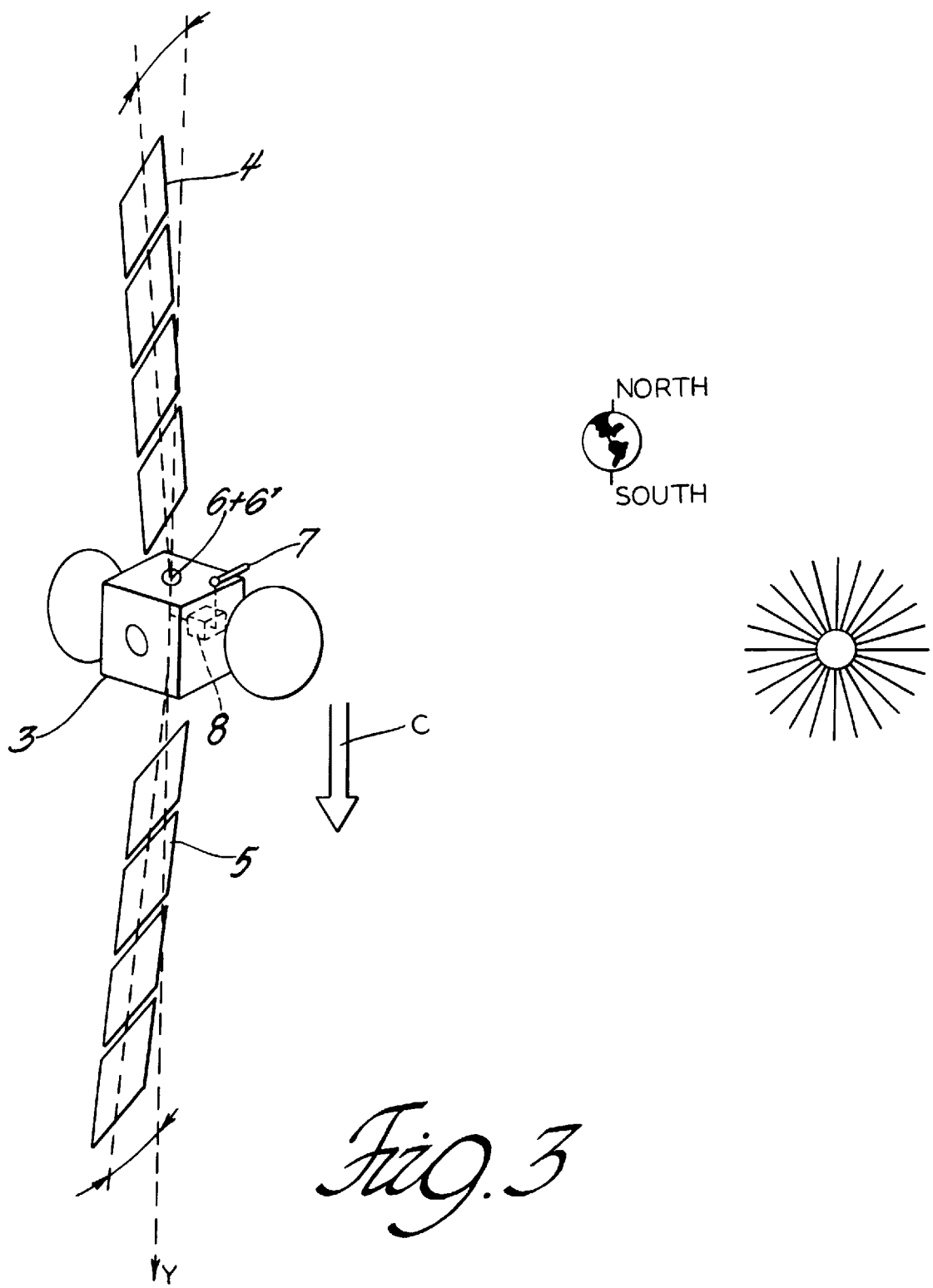
FIG. 3 is a diagrammatic perspective view of the satellite in a configuration in which the solar pressure generates a pitch torque about the Y axis of the satellite.

Referring to FIG. 3, the pitch control torque is obtained by controlled tilting transversely to the solar radiation of at least one of the two solar generator panels (and/or the solar sail if the satellite has a rebalancing sail). This displaces the center of solar thrust relative to the pitch axis Y and so generates a pitch torque.

During orbit control maneuvers this tilting can also be used to displace the center of gravity of the panels and therefore the center of gravity of the satellite as a whole. The center of gravity of the satellite can therefore be moved onto the axis of the thrust vector of the North-South or even East-West control thrusters 9 which minimizes (or even cancels) roll and yaw disturbances due to orbit control (see below with reference to FIGS. 10, 11 and 12). In practice, these disturbing torques are not always totally eliminated but they are at least strongly attenuated so that roll/yaw attitude control during these maneuvers can be entrusted to actuators (such as reaction wheels) which are less powerful and therefore less costly in terms of mass than inertia wheels and which excite to a lesser degree the flexible and nutation modes of the satellite; pointing accuracy will be improved accordingly.

The positioning of the center of gravity may be commanded on the basis of the identification (either automatic or by analysis on the ground) of disturbances during previous maneuvers. During these maneuvers the pitch torque generated by the solar pressure is obviously negligible in comparison with the disturbing torques generated by the orbit correction maneuvers and the action of the actuators intended to compensate for them; pitch control by tilting therefore ceases to be operational, all the more so in that displacement of the center of gravity towards the axis of the thrust vector can, in some cases, introduce an additional disturbing torque rather than correct the attitude in pitch. Another means of pitch control must therefore be used, for example one varying the speed of a wheel which is desaturated subsequently pending the next orbit control maneuver.

Figure 2:
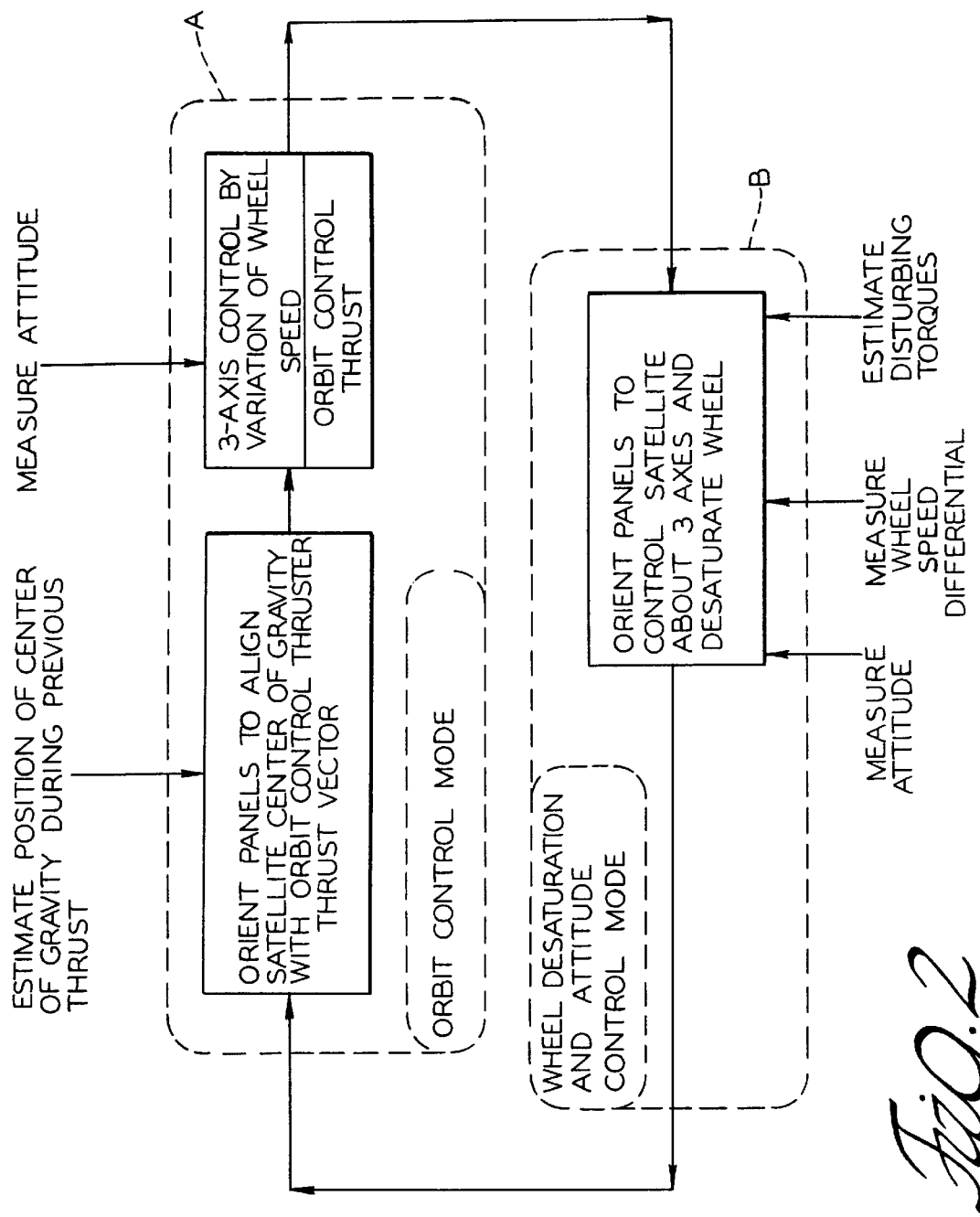
FIG. 2 is a block diagram of attitude control logic for a satellite in accordance with the invention incorporating by way of example the use of roll/yaw control as proposed in French patent 2,655,167 and the use of angular momentum, each of the three components of which can be varied.

This is shown in FIG. 2 which schematically represents the two modes which alternate.

In orbit control mode (frame A) the center of gravity is displaced from its estimated position after the previous maneuver towards the thrust vector axis of the orbit control thrusters. Then, on the basis of instantaneous attitude measurements, a variable angular momentum system 9' (see FIG. 2A) is operated while the orbit control thrust is applied.

Figure 4:
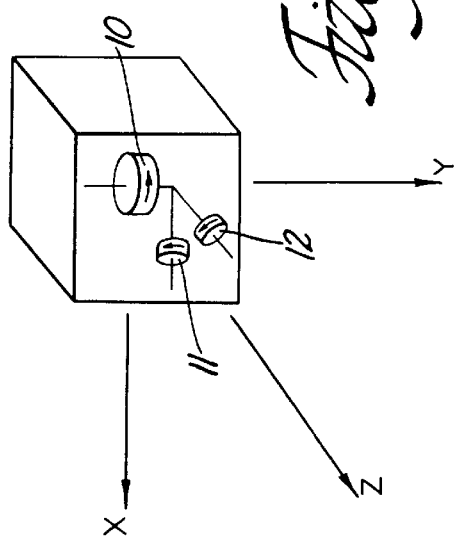
FIGS. 4, 5 and 6 show three known wheel arrangements adapted (to enable use of the logic shown in FIG. 2) to generate angular momentum, all three components of which can be varied.
Figure 5:
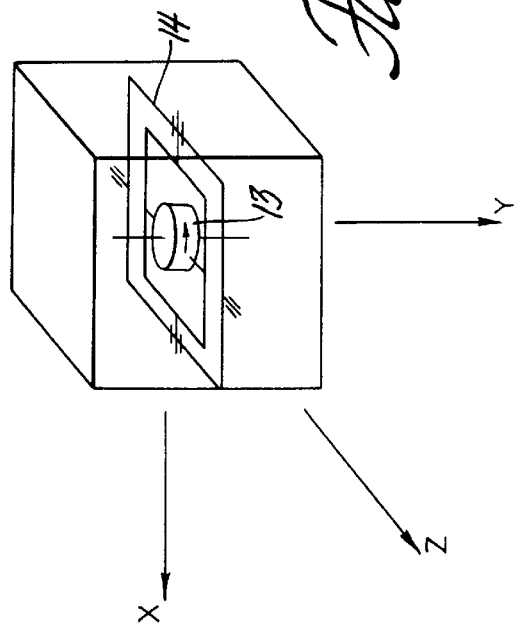
Figure 6:
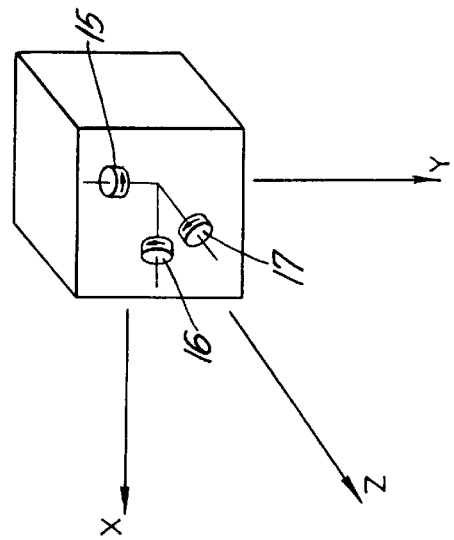

FIGS. 4 through 6 show various known variable angular momentum systems that can be used for the system 9. They include either a pitch kinetic wheel 10 and two reaction wheels 11 and 12 with two axes in the roll/yaw plane, or a pitch kinetic wheel 13 mounted on a double pivot 14, or three reaction wheels 15, 16 and 17 on the pitch axis and two axes in the roll/yaw plane. The axes chosen in the roll/yaw plane may of course be the roll and yaw axes. This latter embodiment has no gyroscopic stiffness.

In attitude control mode (frame B), tilting of the panels is commanded on the basis of attitude measurements, estimated disturbing torques and the measured angular momentum still to be compensated after the previous orbit control maneuver in order to maintain the attitude of the satellite and to desaturate the wheels.

The implementation of the control logic from FIG. 2 for determining the amplitude of the tilting to be applied to the panels will be obvious to those skilled in the art.

Figure 2A:
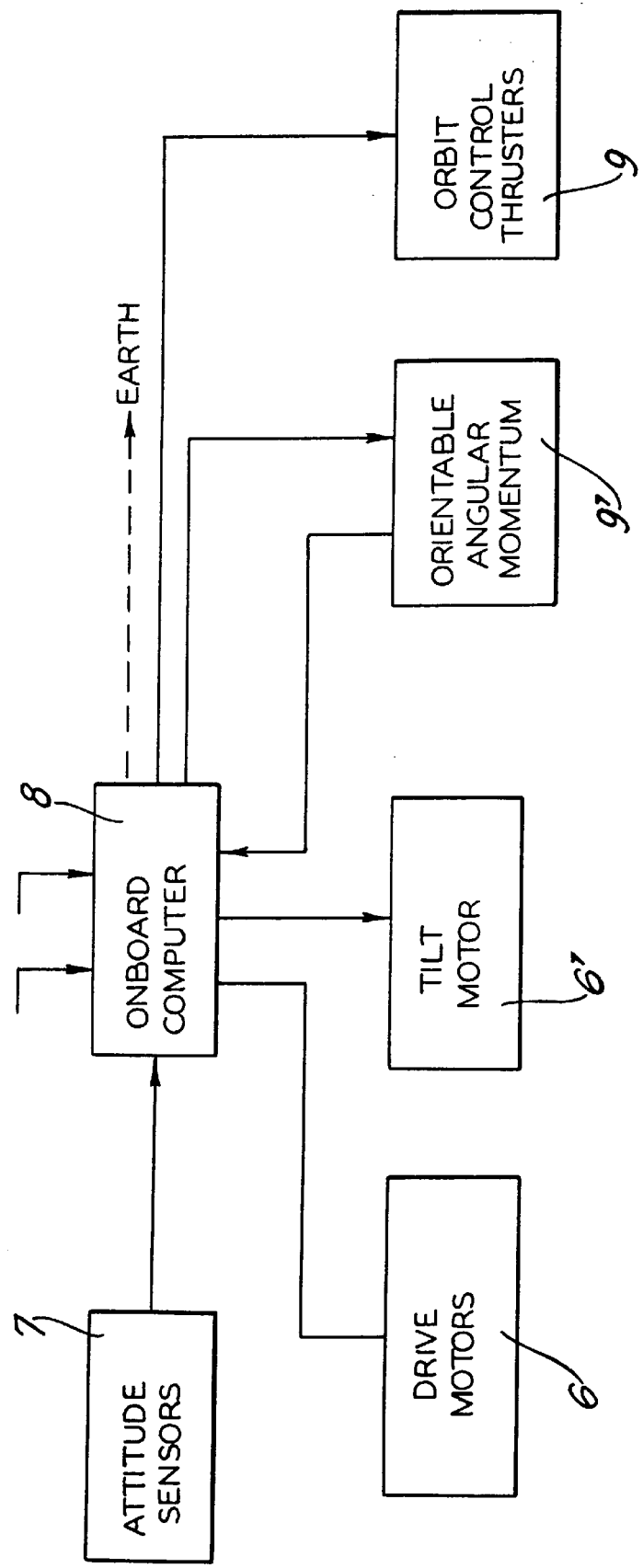
FIG. 2A is a block diagram of component parts of the control logic from FIG. 2.

FIG. 2A is a diagrammatic representation of the components of the control logic: the onboard computer 8 operating on the drive motors 6, the tilt motor(s) 6', the orientable variable angular momentum system 9' and the orbit control thrusters 9, using various signals produced in known ways by attitude sensors (including the sensor 7), from the orientable angular momentum system 9' or even received from other components of the satellite or transmitted from the Earth.

The foregoing description considers attitude in pitch as well as in roll and yaw; roll and yaw control are advantageously effected as disclosed in French reference No. 2,655,167 already mentioned and hereby incorporated by way of reference.

Figure 9:
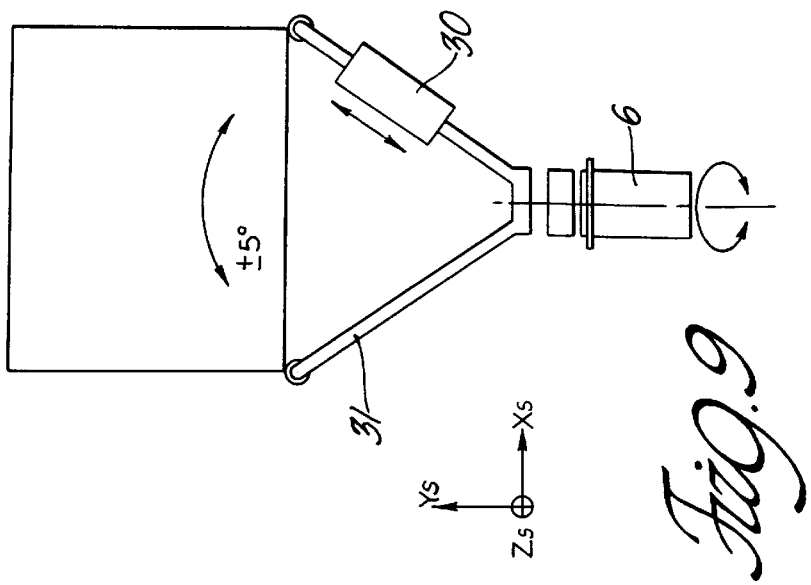
FIG. 9 shows another variation of this arrangement using an articulated deformable triangle to couple the solar panel to the drive motor.
Figure 8:
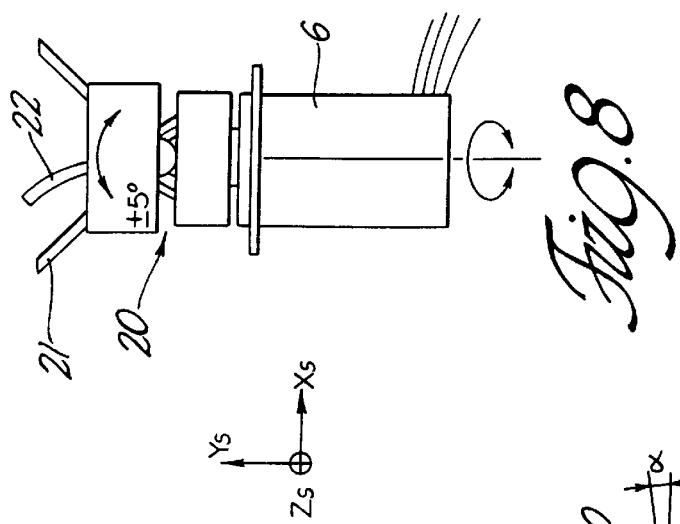
FIG. 8 shows a variation of this arrangement using a pivoted drive motor with its axis transverse to the axis of the drive motor.
Figure 7:
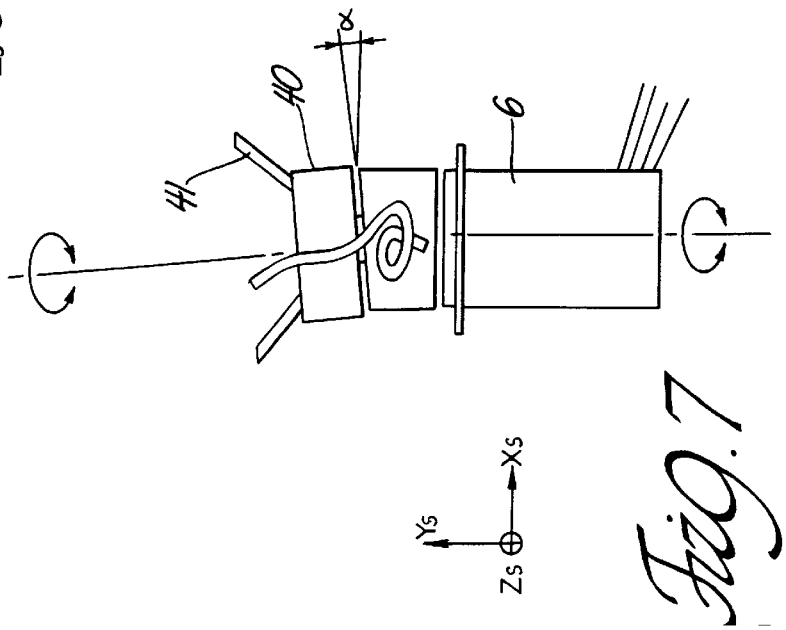
FIG. 7 is a detail view showing how the movement of a solar panel of a satellite in accordance with the invention is controlled, using a rotary motor whose shaft is slightly inclined to the panel drive motor.

One way among others to tilt the panel or sail parallel to its plane is to use a motor 6 as shown in any of FIGS. 7 through 9.

An orientation motor 20 whose axis is perpendicular to the plane of the panels may be fitted between the conventional panel drive motor 6 and the panel mounting arm 21 (see FIG. 8); the range of angular movement is for example ±5° either side of the axis of the motor 6; the figure shows part of the cable 22 conveying power from the solar generator; or a linear motor 30 (of the recirculating ball lead screw and rack type, for example) mounted on one or more of the solar generator mounting arms 31 (see FIG. 9); this arm is then deformable; or the preferred solution, adding a second motor 40 which may be identical to the panel drive motor; the axis of this motor is slightly inclined at an angle α of around 5° for example to that of the drive motor (see FIG. 7); in this case the panel (part of a mounting arm 41 which is shown in the figure) is tilted by the two motors conjointly, the longitudinal axis of the panel sweeping out a cone around the rotation axis of the panel drive motor 6 while continuing to face in substantially the same direction.

This latter solution has many advantages, including:

with only one additional motor it enables displacement of the center of gravity in any direction in a plane parallel to the XZ plane, which provides not only for aligning the center of gravity on the North-South axis for the North-South orbit control maneuver but also for moving the center of gravity towards the East-West axis for East-West orbit control orbit maneuvers;

it is accommodated easily in the body of the satellite, facilitating the arrangement of the solar generator which does not need to be raised to provide room for the additional mechanisms; and should any of the conventional solar generator drive motors fail, redundancy is provided by the addition of the motor with the slightly inclined axis; should this occur, pitch control and center of gravity positioning are reduced in effectiveness by 50%; however, the satellite is spared the serious consequences of loss of one drive motor on conventional satellites.

The axes $X_s$, $Y_s$ and $Z_s$ are the axes of the frame of reference related to the satellite.

FIG. 10 shows the ideal case in which the center of gravity 0' is exactly where required and the thrust vector axis of North-South thrusters 50 and 51 passes through this required position. In this ideal case a North-South orbit control maneuver does not directly induce any disturbing torque.

In reality the center of gravity 0' is offset relative to the required position and the thrust vector axis of the thrusters 50 and 51 does not pass exactly through this required position (FIG. 11). To minimize the disturbing torque the invention teaches displacement of the real center of gravity towards the thrust axis (position 0" in FIG. 12).

It is, therefore, possible on a satellite in accordance with the present invention to dispense with the use of conventional gas jet thrusters for attitude control on station apart from orbit control maneuvers, and during orbit control maneuvers, the reduced disturbances enabling attitude control by less powerful means such as kinetic or reaction wheels, for example. The angular momentum stored in these wheels is then very easily desaturated by solar pressure attitude control which operates apart from orbit control maneuvers.

It will be appreciated that:

a) the tilting of one or more panels of the solar generator (or of the sail opposite the solar generator if the latter is asymmetrical) can be used either to create a pitch control torque by the effect of the solar radiation pressure on the solar generator panels (or the solar sail) or during orbit control maneuvers to position the center of gravity of the satellite in such a way as to minimize the disturbances due to the discrepancy between this center of gravity and the real thrust vector of thus orbit control thrusters, the two applications being usable separately or together on the same satellite;

b) the tilting obtained by any known type of actuator enables use of the solar pressure on the panels of the solar generator for roll and yaw control by any known method (which is not part of the present invention);

c) tilting (up to ±15°) can be achieved in two directions of the roll/yaw plane if a rotation actuator is selected whose axis is slightly inclined to the axis of the solar generator panel drive motor. The tilting is achieved by the differential rotation of the two motors: the drive motor and the additional motor;

d) the angle between the axes of the two motors is between 2° and 15°;

e) the second motor can be used as back-up for the panel drive motor should it fail;

f) the tilting (up to ±15°) can be obtained in one direction by FL linear actuator mounted on one or more mounting arms of the solar generator panel;

g) tilting can also be achieved in one direction by a rotary actuator whose axis is at least approximately perpendicular to the plane of the solar generator panels;

h) in an embodiment that is not shown tilting may be obtained in two directions by two rotary actuators with different axes at least approximately perpendicular to the axis of the solar generator panel drive motor;

i) attitude control about at least one of the roll, pitch and yaw axes is provided totally or in part by a system utilizing solar pressure on surfaces of the satellite;

j) in an embodiment that is not shown attitude control about at least one of the roll, pitch and yaw axes is provided totally or partially by a system utilizing a magnetic dipole onboard the satellite;

k) attitude control about at least one of the roll, pitch and yaw axes is provided totally or partially by a system utilizing the variation of at least one of the components of the angular momentum onboard the satellite;

l) attitude control during orbit control maneuvers is obtained by varying the three components of the onboard angular momentum and by minimizing disturbances by means of the invention;

m) attitude control outside orbit control maneuvers is obtained using solar pressure (in an embodiment that is not shown with the assistance of magnetic dipoles);

n) in an embodiment that is not shown attitude control outside orbit control maneuvers is provided by magnetic dipoles, possibly with the assistance of solar pressure;

o) attitude control outside orbit control maneuvers is used to align the components of the onboard angular momentum with a set point value;

p) the satellite is a geostationary satellite;

q) all or some of the orbit control thrusters are of the low-thrust type (<1 Newton);

r) all or some of the orbit control thrusters are of the ionic type;

s) all or some of the orbit control thrusters are of the electric arc ionization type; and t) all or some of the orbit control actuators are orientable surfaces exposed to the solar pressure.

The remainder of the description, which refers to FIGS. 13 through 16, concerns an application wherein the orbit and attitude control propulsion system used in the operational phase does not use chemical propulsion. It is, therefore, free of the drawbacks inherent to chemical propulsion, such as risk of leaks, sudden variations in attitude and/or possible generation of vibrations. Instead, the excellent specific impulse of electrical thrusters (5 to 10 times greater than conventional chemical thrusters) is used.

In a minimal configuration an electrical propulsion system 60 includes only two thrusters 61 and 62 (or 63 and 64) disposed substantially symmetrically relative to the plane of the Y and Z axes, with an inclination $\alpha 1$ of approximately 40° to the pitch axis. This angle $\alpha 1$ is usually between 15° and 65° in absolute value (meaning that its cosine is between 0.43 and 0.97 in absolute value) and the cosine of the inclination $\alpha 2$ of these thrusters to the roll axis is between 0.25 and 0.75 in absolute value (angle between 40° and 75° in absolute value).

These thrusters are preferably perpendicular to the yaw axis. Constraints of available space may require that these thrusters are inclined at an angle α3 to the yaw axis between 70° and 110° (cosine between −0.35 and 0.35).

The thrusters are advantageously disposed near the edges of the satellite body around a common side of the satellite (in this instance the North side for the thrusters 61 and 62) parallel to the Z axis; the thrusters are preferably at the middle of these edges.

In the absence of any failures, a pair of thrusters is sufficient for East-West orbit corrections (thrusts are generated parallel to the Y axis at the same time, it is true) and orbit corrections parallel to the Y axis. The requirement for a thrust towards the South is achieved by a thrust towards the North one half-orbit later.

The propulsion system 60 advantageously includes a second pair of electric thrusters 63 and 64 disposed near the opposite side (the South side), each substantially symmetrical to the other about the YZ plane; the pairs of thrusters are preferably symmetrical to each other about the XZ plane.

A propulsion system of this kind with only four electric thrusters 61 through 64 provides for all necessary orbit correction operations (using these thrusters in pairs as much as possible), even should one thruster fail.

Without departing from the scope of the invention it is possible to use a greater number of electric thrusters to increase reliability.

In principle the orientation of the thrusters 61 through 64 relative to the body is fixed. In a more sophisticated version, however, they may be rendered orientable, although this increases the mass and reduces reliability.

The satellite also includes a kinetic energy storage system with no gyroscopic stiffness formed by the reaction wheels 15 through 17 from FIG. 6 which are used to temporarily store an overall angular momentum about any axis. Speed sensors 15A, 16A and 17A are, in practice, associated with the reaction wheels and, in particular, are adapted to provide a pitch angular speed signal.

Figure 15:
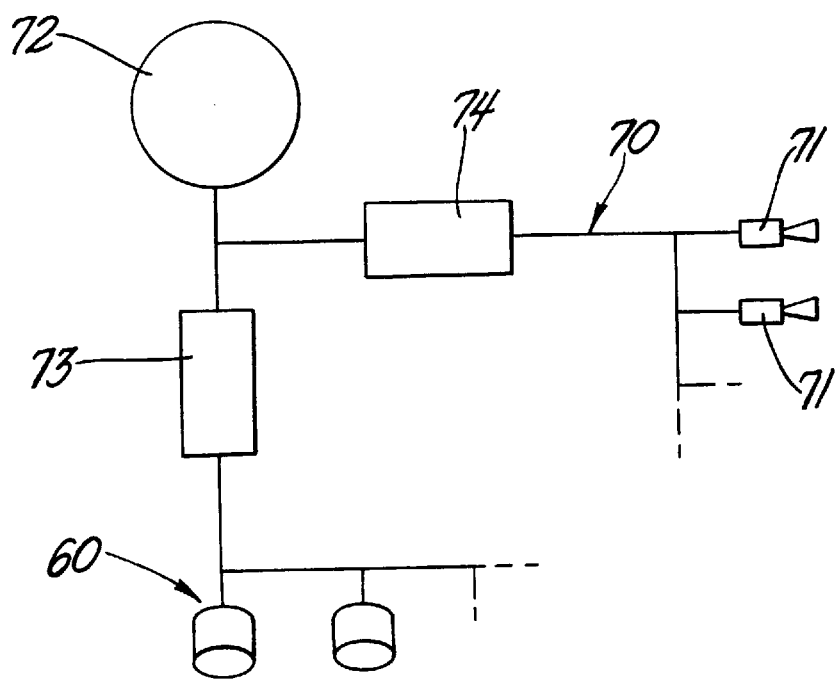
FIG. 15 is a diagram of the thruster propellant supply circuit.

The satellite in its transfer orbit (pending transfer to its operational orbit) is in a configuration and an orientation different than those it assumes thereafter, which requires a dedicated attitude control system (not shown in FIGS. 13 and 14) for this injection phase. Referring to FIG. 15, this system 70 advantageously uses thrusters 71 using the same single-propellant as the electric thrusters of the system 60. The various thrusters are supplied from a storage tank 72 via pressure regulator and flow rate regulator systems 73 and 74 of any appropriate known type.

In an embodiment of the satellite that is not shown, the satellite includes a dual propellant system for propulsion and attitude control during the phase of injection into the operational orbit, geostationary or otherwise.

In the example shown (see FIG. 14) the satellite has on its −Z side a propulsion system 80 for injecting it into geostationary orbit; this may be a solid fuel system.

The electrical propulsion system 60 can contribute to the injection of the satellite into its operational orbit, geostationary or otherwise.

For the injection phase, the satellite depicted in FIG. 14 may further include an additional electric propulsion system composed of two electric thrusters 90 parallel to the −Z axis.

The temporary reduction to zero of the angular momentum accumulated by the reaction wheels in the operational orbit, geostationary or otherwise, is preferably carried out with respect to the three axes X, Y and Z using the solar radiation pressure on the panels in combination with the action of the thrusters.

Alternatively, attitude correction in roll and in yaw may be obtained using magnetic loops interacting with the terrestrial magnetic field.

Of course, the reduction to zero of the instantaneous angular momentum component is easily achieved by means of the electric thrusters 61 through 64, all that is required is a different period of operation of two thrusters required to operate simultaneously.

Although in the foregoing description it has been regarded as particularly beneficial to have no gyroscopic stiffness, it should be understood that the invention is generally applicable to the case of an angular momentum having a continuously non-null component, for example a component along the Y axis (and therefore with an inertia wheel having a continuously non-null angular momentum about the Y axis, as in FIGS. 4 and 5, for example).

The number of wheels may advantageously be greater than three to provide redundancy.

For example, the satellite shown is a telecommunication satellite weighing 3,000 kg at launch with large (80 m$^2$) solar generators designed to generate 10 kW after 15 years.

Four ion thrusters (such as those supplied by MESSERSCHMITT-BOLKOW-BLOHM (MBB)) with a thrust of 100 millinewtons are disposed in the XY plane with a 60° slant relative to the Y axis. This configuration has the advantage of good efficiency for the North and South thrusts and also makes it possible to limit the disturbing torque about the Z axis to an acceptable value for the reaction wheels in the event of degraded operation with one thruster failed. The three reaction wheels have a capacity of ±15 Nms. They use friction-free magnetic bearings and only the electrical part is redundant, inside each wheel.

The solar generators are pointed towards the Sun at all times by the device 6+6' which rotates the generator relative to the satellite once each day and also enables the longitudinal axis of the solar generator to be inclined a few degrees (7° for example) to the Y axis of the satellite. Controlled by the onboard computer, these two movements are used to desaturate the reaction wheels, in other words to slow them down by generating the necessary solar torque. Solar control applies to the three axes of the satellite.

Orbit maneuvers take place twice each day, lasting about one hour, the required electrical power of approximately 1.5 kW being provided by a battery which is charged between two maneuvers.

This fine control concept (no angular momentum, no chemical thrusters) is such that any failure can only cause very slow drift of the satellite which is easily observable and quickly compensated by switching to the back-up unit for the failed unit. The periods of depointing are, therefore, minimized and the mission function is guaranteed at all times, which is a fundamental advantage.

A set of chemical thrusters is used nominally for the transfer orbit alone. Four chemical thrusters are sufficient but eight thrusters (not shown) are required to guard against failure. They are grouped together on the side away from the Earth around the apogee thruster. After the first few weeks of satellite operation these thrusters are isolated by solenoid valves which eliminates all risk of leaks and is of considerable advantage because no emergency action is required by control stations, always difficult in the event of propellant leaks; there is no risk of thermal changes due to the consequences of evaporation if leaks occur; and there is no risk of reduced mission duration following propellant leaks.

In exceptional cases of multiple failures there is provision for opening the solenoid valves to point the satellite towards the Sun in so-called survival mode pending expert advice on resuming solar control, with the chemical thrusters shut off again.

A mass balance associated with the four thrusters and their fuel, as compared with that of a conventional system with 12 chemical thrusters, shows a saving of around 800 kg. For a satellite with a launch weight of four tons and a mission life of 15 years, the additional dry mass is 70 kg for the electric thrusters but the fuel saving [(chemical propulsion)–(Xenonpropulsion)] is 900 kg.

Figure 16:
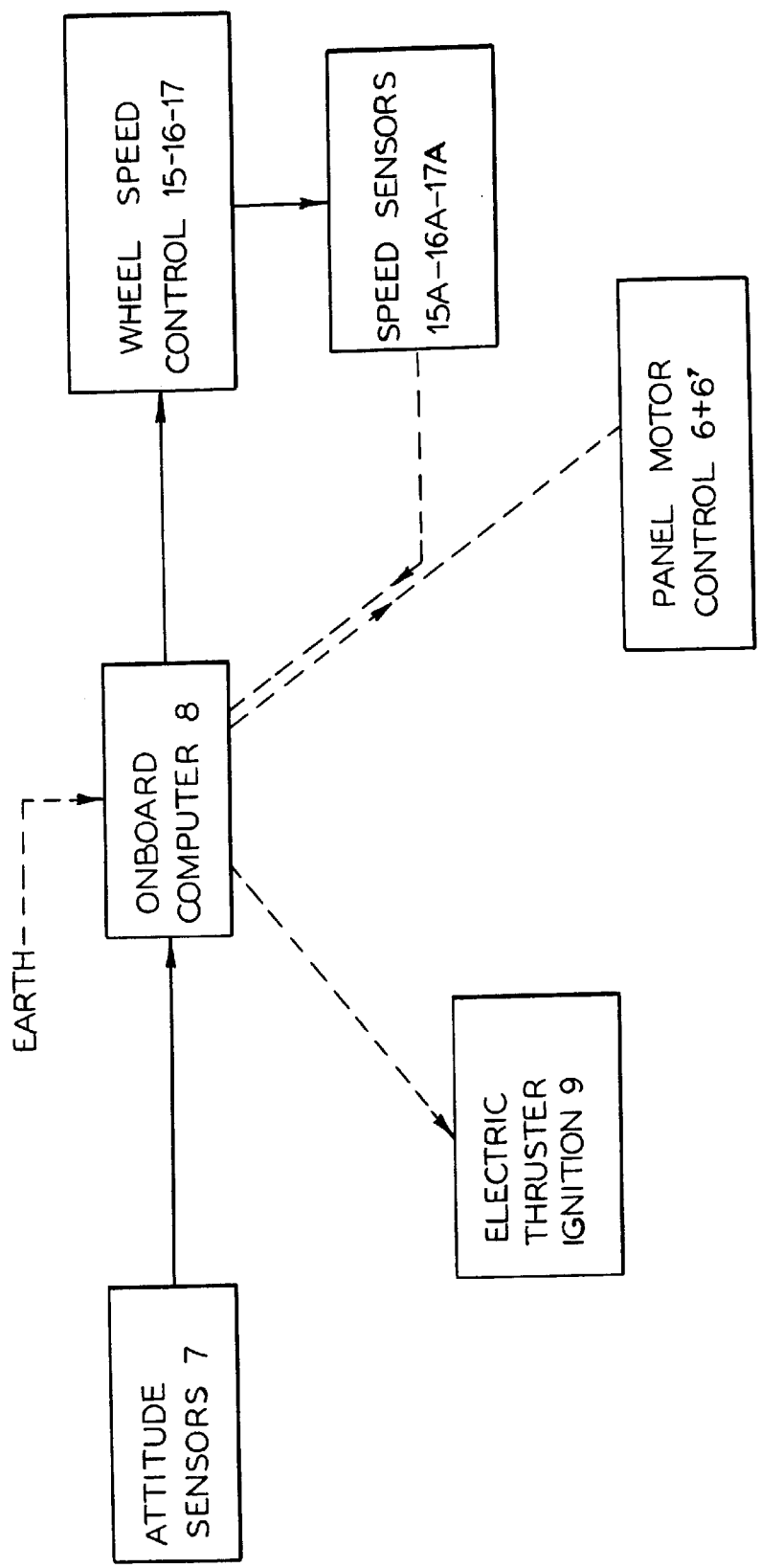
FIG. 16 is a block diagram of the control system for the satellite from FIGS. 13 and 14.

FIG. 16 is a block diagram of the control system. It is very similar to FIGS. 2 and 2A.

It will be realized that the invention proposes a novel combination of components known in themselves and already proven in orbit over a period of many years, such as magnetic bearing wheels (SPOT satellites), and solar generator rotation devices (all geosynchronous satellites).

It goes without saying that the foregoing description has been given by way of non-limiting example only and that numerous variants may be proposed by one skilled in the art without departing from the scope of the invention. The invention applies to any satellite having at least one surface intended principally to be exposed to solar radiation and extending from the satellite in a given direction. The order of the drive and tilt motors may be reversed, the drive motor being disposed between the tilt motor and the solar generator panel. The range of movement of the tilt motors may be increased without altering the principle of the invention.

The invention also applies to any satellite in respect of which the necessary calculations are carried out in whole or in part on the ground.

What is claimed is:

1. A method of controlling the attitude of a satellite relative to a predetermined axis thereof, said satellite comprising:

a satellite body;

at least one planar surface member exposed to solar radiation pressure, said at least one planar surface member having a central axis extending in a first direction away from said satellite body, said first direction being substantially coaxial with said predetermined axis;

an attitude measuring device adapted to measure an attitude error angle about said predetermined axis; and a computer connected to said attitude measuring device and adapted to determine from the attitude error anile the value of an attitude correction torque to be applied about said predetermined axis, said method comprising the step of:

tilting said central axis of said at least one planar surface member relative to said predetermined axis such that said central axis of said at least one planar surface member is tilted away from said predetermined axis substantially transversely to said solar radiation pressure so as to generate a torque about said predetermined axis substantially equal to said value of said attitude correction torque.

2. A method according to claim 1, wherein said satellite is circulating on a plane orbit and said predetermined axis is perpendicular to said plane orbit.

3. A method according to claim 2, wherein said at least one planar surface member comprises two solar sails extending in opposite directions away from said satellite body.

* * * * *

UNITED STATES PATENT AND TRADEMARK OFFICE
CERTIFICATE OF CORRECTION

Page 1 of 2

PATENT NO. : 5,850,992
DATED : December 22, 1998
INVENTOR(S) : Flament et al.

It is certified that error appears in the above-identified patent and that said Letters Patent is hereby corrected as shown below:

Title page, item [57], line 3, kindly delete "on board" and insert ---- onboard ----.

Title page, item [57], line 12, kindly delete "on-board" and insert ---- onboard ----.

Column 4, line 63, kindly delete "a" second occurrence and insert ---- $\alpha$ ----

Column 6, line 26, kindly delete "repainting" and insert ---- repointing ----.

Column 8, line 42, kindly delete the period " . " and insert ---- ; solar control using panel drive motors is particularly indicated (see in particular French patent applications 89-15732 and 89-17479 respectively filed 29 November and 29 December 1989).----.

Column 13, line 23, kindly delete " 0' " and insert ---- 0 ----.

Column 13, line 52, kindly delete "thus" and insert ---- the ----.

UNITED STATES PATENT AND TRADEMARK OFFICE
CERTIFICATE OF CORRECTION

PATENT NO. : 5,850,992
DATED : December 22, 1998
INVENTOR(S) : Flament et al.

It is certified that error appears in the above-identified patent and that said Letters Patent is hereby corrected as shown below:

Column 14, line 4, kindly delete "FL" and insert ---- a ----.

Column 16, line 28, kindly delete " North and" and insert ---- North or ----.

Column 18, line 15, kindly delete "anile" and insert ---- angle ----.

Signed and Sealed this

Twenty-fourth Day of August, 1999

Attest:

Q. TODD DICKINSON

*Attesting Officer*     *Acting Commissioner of Patents and Trademarks*